United States Patent [19]

Hwang

[11] Patent Number: 4,975,678
[45] Date of Patent: Dec. 4, 1990

[54] CAR ALARM CONTROL SYSTEM

[76] Inventor: Shih-Ming Hwang, No. 11, Alley 12, Lane 7, Ching Tyan Street, Taipei, Taiwan

[21] Appl. No.: 457,524

[22] Filed: Dec. 27, 1989

[51] Int. Cl.$^5$ .............................................. B60R 25/10
[52] U.S. Cl. .................................... 340/426; 340/428; 340/429; 340/430; 340/457.2
[58] Field of Search ............... 340/426, 428, 429, 430, 340/457.2

[56] References Cited

U.S. PATENT DOCUMENTS

| | | | |
|---|---|---|---|
| 4,205,300 | 5/1980 | Ho et al. | 340/429 |
| 4,665,379 | 5/1987 | Howell et al. | 340/428 |
| 4,772,879 | 9/1988 | Hein | 340/429 |
| 4,862,140 | 8/1989 | Case et al. | 340/457.2 |

Primary Examiner—Joseph A. Orsino
Assistant Examiner—Geoff Sutcliffe
Attorney, Agent, or Firm—Bacon & Thomas

[57] ABSTRACT

A vehicle alarm control system built into a single integrated circuit, which includes a number of inputs including M/D−, INO−, INO+, H/T−,C.S+, and INC− which monitor a plurality of sensors strategically placed around an automobile; a fail safe/override/memory circuit which prevents the alarming of the alarm should any of the inputs become defective but allows the user to temporarily disable the defective input; and instant trigger override control which allows the user to cause the sensors to instead trigger the alarm after a delay upon the opening of the door; a main power cut warning control which triggers to provide an audible warning signal should the alarm be removed; a per-entry alert control which triggers an audible warning immediately should the automobile's door handle be touched while the alarm is armed; and a headlight on warning control which causes the alarm to give an audible warning if the automobile's headlights are on after the automobile's engine is turned off.

5 Claims, 1 Drawing Sheet

CAR ALARM CONTROL SYSTEM

BACKGROUND OF THE INVENTION

Vehicle alarms are designed to detect either attempted unauthorized intrusion of the protected vehicle or vandalism to said vehicle, and sound a warning upon said detection. Most such alarms offer a number of common features such as active and/or passive arming, instant or delay trigger, input from a plurality of sensors connected to the automobile's doors, hood, trunk, or other areas, and output to a siren or lights.

Conventional vehicle alarms as described above suffer from a number of drawbacks:

1. The number of functions available usually do not satisfy the consumer's demands.
2. Complicated structure due to the large number of discrete components makes the alarm prone to errors.
3. Complicated structure due to the large number of discrete components makes mass production difficult.

The present invention provides an automobile alarm control system which offers a number of features to an automobile alarm:

1. Single IC—All of the circuits needed to control the alarm's functions are built-into a single integrated circuit (IC) for ease of manufacture and trouble-shooting.
2. Complete protection—Completely protects an automobile by monitoring said automobile's doors, hood, trunk, windows, and the rest of the body by means of a plurality of sensors strategically placed in said automobile.
3. Power door lock and power window control—Controls the locking and unlocking of said automobile's power door lock system and the closing of its power windows in conjunction with the arming and disarming of said automobile.
4. Electric fan control—Prevents said automobile alarm control system from triggering via a motion sensing or current sensing device when said automobile's electric fan turns on.
5. Fail-safe and override control—If any sensor is not operating properly, said automobile alarm control system will prevent said alarm from arming in order to alert the user of said alarm to the problem. However, should said user desire to bypass said fail-safe and override control so that said alarm can still be armed in the above-described situation, said fail-safe and override control allows for this possibility. Furthermore, should said user loose his or her normal means of disarming said alarm, said fail-safe and emergency disarm control provides an alternative method for said disarming.
6. Instant trigger override control—If the normal means for disarming said alarm were to malfunction or become lost, said user would have the means to cause those sensors which normally trigger said alarm instantly upon the opening of a door of said automobile while said alarm is armed to instead trigger said alarm after a delay upon said opening of said door.
7. Headlight on warning control—If the automobile's headlights are not turned off after said automobile's engine is turned off, the alarm will give an audible and visible warning to the owner.
8. Main power cut warning control—If power to the alarm's is ever removed, an audible warning signal will be given immediately.
9. Pre-entry alert control—If an automobile's door's handle is touched, an audible and visible warning will be given immediately. A microwave, shock, or other such sensor can also be connected to this control in order to detect a thief's presence before an actual break-in or vandalism.

SUMMARY OF THE INVENTION

The present invention provides a vehicle alarm control system for an automobile which includes inputs from a plurality of sensors mounted in strategic locations around said automobile and which are labeled M/D−, INO−, INO+, H/T−, C.S.+, and INC−, the triggering of any of which immediately triggers an audible or visible warning; electric fan control which disables inputs M/D− and C.S.+ when said automobile's electric fan is running while said alarm is armed to prevent accidental triggering of said alarm by said fan; fail-safe and override control which normally prevents the arming of said alarm should any of said inputs become defective but which allows the user of said automobile to temporarily disable said defective input to allow said alarm to arm and said inputs which are not defective to protect said automobile; instant trigger override control which allows said user to cause those sensors which normally trigger said alarm instantly upon the opening of a door of said automobile while said alarm is armed to instead trigger said alarm after a delay upon said opening of said door should the normal means for disarming said alarm malfunction or become lost; headlight on warning control which cause the alarm to give an audible warning to said user if said automobile's headlights are on after said automobile's engine is turned off; main power cut warning control which triggers an audible warning signal immediately should the power to said alarm ever be removed; pre-entry alert control which triggers an audible warning immediately should said automobile's door handle be touched while said alarm is armed or if, with the addition of optional sensors, a thief prepares to break into or vandalize said automobile while said alarm is armed; the above-mentioned functions of said vehicle alarm control system being built into a single application-specific IC for ease in manufacturing and trouble-shooting.

DETAILED DESCRIPTION OF THE PREFERRED EMBODIMENT

Figure 1:
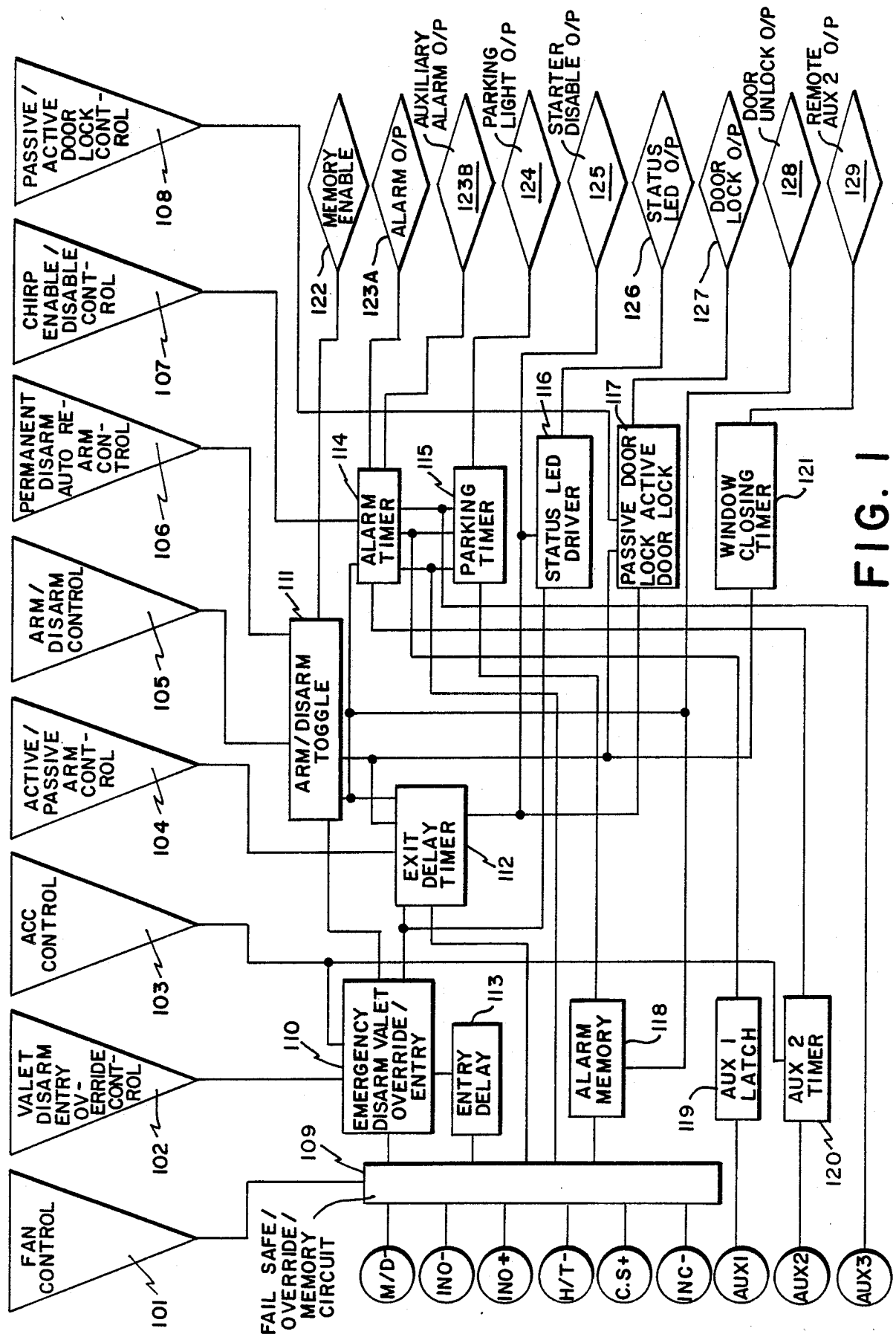
FIG. 1 illustrates a circuit block diagram according to the present invention. Note that this circuit block diagram details a single IC which performs all the described functions, but does not include the other components necessary for operation of said IC.

The present invention includes the following inputs to detect changes in the states of various switches, sensors, and electrical circuits in order to detect attempted break-ins or vandalism to an automobile:

1. M/D− is connected to a normally-opened switch which is connected between said alarm system and the metal body of or other source of electrical ground in said automobile which, when closed while said alarm is armed, typically by shock or motion to said automobile caused by attempted break-in or vandalism to said automobile, immediately triggers said alarm. Said alarm, when triggered in such a fashion, activates alarm memory (118) to indicate attempted break-in or vandalism to said automobile, and causes an audible device to sound and the lights of said automobile to flash via alarm O/P (123A) and parking light O/P (124) as shown below.

2. INO− is connected to a normally-opened switch which is connected between said alarm system and the metal body of or other source of electrical ground in said automobile and which, when said switch is closed while said alarm is armed, typically by the opening of a door of said automobile, immediately triggers said alarm. Said alarm, when triggered in such a fashion, activates alarm memory (118) to indicate attempted break-in or vandalism to said automobile, and causes an audible device to sound and the lights of said automobile to flash via alarm O/P (123A) and parking light O/P (124) as shown below.

3. INO+ is connected to a normally-opened switch which is connected between said alarm system and some source of electrical power in said automobile (typically the positive terminal of the battery of said automobile) and which, when said switch is closed while said alarm is armed, typically by the opening of a door of said automobile, immediately triggers said alarm. Said alarm, when triggered in such a fashion, activates alarm memory (118) to indicate attempted break-in or vandalism to said automobile, and causes an audible device to sound and the lights of said automobile to flash via alarm O/P (123A) and parking light O/P (124) as shown below.

4. H/T− is connected to a normally-opened switch which is connected between said alarm system and the metal body of or other source of electrical ground in said automobile and which, when said switch is closed while said alarm is armed, typically by the opening of a hood or trunk of said automobile, immediately triggers said alarm. Said alarm, when triggered in such a fashion, activates alarm memory (118) to indicate attempted break-in or vandalism to said automobile, and causes an audible device to sound and the lights of said automobile to flash via alarm O/P (123A) and parking light O/P (124) as shown below.

5. C.S.+ senses the amount of current flowing from said battery and immediately triggers said alarm should the amount of said current suddenly increase while said alarm is armed, typically by the turning on of a light in said automobile when said door is opened. Said alarm, when triggered in such a fashion, activates alarm memory (118) to indicate attempted break-in or vandalism to said automobile, and causes an audible device to sound and the lights of said automobile to flash via alarm O/P (123A) and parking light O/P (124) as shown below.

6. INC− is connected to a normally-closed switch which is connected between said alarm system and the metal body of or other source of electrical ground in said automobile and which, when said switch is opened while said alarm is armed, typically by the removal by thieves or vandals of a radio or some other removable object from said automobile, immediately triggers said alarm. Said alarm, when triggered in such a fashion, activates alarm memory (118) to indicate attempted break-in or vandalism to said automobile and causes an audible device to sound and the lights of said automobile to flash via alarm O/P (123A) and parking light O/P (124) as shown below.

AUX1 is an input to the present invention which is connected to a sensor which is connected to the handle of said door and which, when said handle is touched in an attempt to open said door while said alarm is armed, immediately triggers said alarm. AUX1 may also be connected to a sensor such as a microwave or shock sensor to detect the presence of a thief before said thief actually breaks into or vandalized said automobile. Said alarm, when triggered in such a fashion, causes an audible device to sound via alarm O/P (123A) as shown below.

AUX2 is connected to the headlights of said automobile and, when said headlights are turned on within a preset time after the engine of said automobile is turned off, triggers said alarm. Said alarm, when triggered in such a fashion, causes an audible device to sound via alarm O/P (123A) as shown below.

AUX3 is connected to the main power of said alarm and, when said main power is removed from said alarm, typically by thieves or vandals who physically damage said battery or cut the wire which supplies power from said battery to the electrical circuits of said automobile in order to disable said alarm, immediately triggers said alarm. Said alarm, when triggered in such a fashion, causes an audible device to sound via alarm O/P (123A) as shown below.

The present invention according to FIG. 1 also offers a fail-safe/override/memory circuit (109) which functions to prevent said alarm from arming while either INO−, INO+, H/T−, or INC− are tripped.

The present invention according to FIG. 1 also features the following controls:

Fan control (101) temporarily disables M/D− and C.S.+ while the electrical engine cooling fan of said automobile (if said automobile is so equipped) is operating in order to prevent M/D− from triggering said alarm due to shock or vibration of said fan's operation and to prevent C.S.+ from triggering said alarm due to the change in current of said battery due to said fan's operation.

Valet disarm entry override control (102) is connected to an on/off toggle switch which is connected between said alarm and the metal body or other source of electrical ground in said automobile.

ACC control (103) is connected to an on/off toggle switch (typically the ignition switch of said automobile) which is connected between said alarm and some source of electrical power in said automobile (typically the positive terminal of the battery of said automobile).

When said toggle switch which is connected to ACC control (103) is turned on, alarm memory (118) is reset, so that there is no indication of attempted break-ins or vandalism which may have occurred before said toggle switch was turned on.

If, while said alarm is armed, said toggle switch which is connected to ACC control (103) is turned on and said toggle switch which is connected to said valet disarm entry override control (102) is turned on and then off, said alarm will disarm.

If, while said alarm is disarmed and said toggle switch which is connected to ACC control (103) is turned on, said toggle switch which is connected to said valet disarm entry override control (102) is turned on and then off, said alarm will be prevented from arming under any circumstance; that is, said alarm will be in the valet mode. Furthermore, while said alarm is in said valet mode, AUX2 will be disabled. If, while said alarm is in said valet mode and said toggle switch which is connected to ACC control (103) is turned on, said toggle switch which is connected to said valet disarm entry override control (102) is turned on and then off, said alarm will be allowed to arm in the normal manner as disclosed below; that is, said alarm will no longer be in said valet mode.

While either INO−, INO+, H/T−, or INC− is triggered (such as said door being left open or a switch to detect the opening of said door is broken) while said alarm is disarmed, fail safe/override/memory circuit (109) will prevent said alarm from arming. If at this time said toggle switch which is connected to said valet disarm entry override control (102) is turned on, said INO−, INO+, H/T−, or INC− which is triggered will be disabled, and thus said alarm can be armed manually as shown below.

Arm/disarm control (105) is connected to the metal body or other source of electrical ground in said automobile via an external arm/disarm device such as an external normally-open key lock switch or a remote control device, and receives a momentary ground signal via said external arm/disarm device to initiate arming and disarming of said alarm as disclosed below. Note that said external arm/disarm device may take one of several forms, and is not a part of the present invention or this patent application.

Active/passive arm control (104) is connected to an on/off toggle switch. When said toggle switch is off and said alarm is disarmed, said alarm arms passively (automatically) after the expiration of an exit delay time the length of which is controlled by an exit delay timer (112) after said toggle switch which is connected to ACC control (103) is turned off and either M/D−, INO−, INO+, H/T−, C.S.+, or INC− is triggered and then either reset or disabled by valet disarm entry override control (102). When said toggle switch which is connected to active/passive arm control (104) is on and said alarm is disarmed, said alarm arms manually upon receipt of a signal by arm/disarm control (105) from said external arm/disarm device while said toggle switch which is connected to ACC control (103) is off and M/D−, INO−, INO+, H/T−, C.S.+, and INC− are all either reset or disabled by valet disarm entry override control (102).

Permanent disarm/auto rearm control (106) is connected to an on/off toggle switch. If arm/disarm control (105) receives a signal from said external arm/disarm device while said alarm is armed, said alarm will disarm temporarily. At this time, a re-entry time the length of which is controlled by exit delay timer (112) starts. Note that after said alarm is disarmed in this manner, one of the following three situations will occur:

1. When said toggle switch is on—If, before the expiration of said re-entry time either INO−, INO+, H/T−, or C.S.+ is triggered, said alarm will be permanently disarmed until rearmed as shown above.

2. When said toggle switch is off—If, before the expiration of said re-entry time either INO−, INO+, H/T−, or C.S.+ is triggered, said alarm will be remain temporarily disarmed and the counter of said re-entry time will be reset. Now, if said triggered INO−, INO+, H/T−, or C.S.+ is reset, said counter will start again. If said re-entry time expires before either INO−, INO+, H/T−, or C.S.+ are triggered, said alarm will rearm itself automatically. Said triggering and resetting process may be repeated indefinitely until said re-entry time expires, in which case said alarm will remain armed, or until said toggle switch connected to said ACC control (103) is turned on, in which case said alarm will be permanently disarmed until rearmed as shown above.

3. In either case, if said re-entry time expires before either INO−, INO+, H/T−, or C.S.+ are triggered, said alarm will rearm itself automatically.

Chirp enable/disable control (107) is connected to an on/off toggle switch to control whether said alarm does or does not trigger said connected audible device when arm/disarm control (105) receives a signal from said external arm/disarm device to initiate the arming or disarming of said alarm as shown above, or when either INO−, INO+, H/T−, or C.S.+ is reset to arm said alarm as shown above. If said toggle switch is on, said audible device will be triggered as shown below in either of the two above situations. If said toggle switch is off, said audible device will not sound in either of the above two situations.

Passive/active door lock control (108) is connected to an on/off toggle switch to control when the power door lock system of said automobile's doors locks upon arming of said alarm. If said toggle switch which is connected to passive/active door lock control (108) is off, said doors are locked automatically when said alarm is armed as shown below. If said toggle switch which is connected to passive/active door lock control (108) is on, said doors are locked only upon receipt of a signal from said external arm/disarm device via arm/disarm control (105) as shown below.

Alarm O/P (123A) drives said audible device to sound in reaction to attempted break-ins and vandalisms detected by said alarm in one of seven ways:

1. When said alarm is disarmed, if within the time determined by the AUX2 timer (120) after said toggle switch which is connected to ACC control (103) is turned off the headlights of said automobile have not been turned off as determined by AUX2, alarm O/P (123A) will drive said audible device intermittently according to the time set by alarm timer (114). Said time is less than 1.0 seconds. Said audible device will sound in this manner until said headlights are turned off.

2. While said alarm is arming, if input INO−, INO+, H/T−, and/or INC−, are triggered, alarm O/P (123A) will drive said audible device for a very short period of time as determined by alarm timer (114) when the last of said inputs is reset. Said time is less than 1.0 seconds long. Alarm O/P (123A) will also drive said audible device for said very short period of time while said alarm is arming in response to receipt of a signal from said external arm/disarm device via arm/disarm control (105).

3. When said alarm is fully armed, if input M/D−, INO−, INO+, H/T−, C.S.+, or INC− is triggered, alarm O/P (123A) will immediately start to drive said audible device. Alarm O/P (123A) will drive said audible device to sound for a sounding time determined by alarm timer (114). If within said sounding time said triggered input is reset, alarm O/P will stop driving said sounding device at the expiration of said sounding time. However, if within said sounding time said triggered input is not reset, said alarm input will stop driving said audible device for a rest time determined by alarm timer (114), then drive said audible device for said sounding time, then stop driving said audible device for said rest time, then drive said audible device for said sounding time, then stop driving said audible device for said rest time, and then drive said audible device for said sounding time, for a total of four sounding cycles.

4. When said alarm is armed, if arm/disarm control (105) receives a signal from said external arm/disarm device to disarm said alarm, alarm O/P (123A) will drive said audible device to sound two times, the length of said sounds and the rest time between said sounds being determined by alarm timer (114), and are less than 1.0 seconds long. Said two sounds indicate to the user of said alarm that said alarm is disarmed.

5. While said alarm is armed, if someone attempts to open said doors via the handles of said doors or triggers any sensors connected to AUX1, AUX1 will cause alarm O/P (123A) to drive said audible device to sound one time, the length of said sounding being determined by alarm timer (114). Said sounding time is less than 1.0 seconds. However, if said attempt to open said doors via said handles occurs within a certain time after said alarm is armed, or within said time after a previous attempt to open said doors via said handles, said time determined by AUX1 latch (119), alarm O/P (123A) will not drive said audible device.

6. Regardless of whether said alarm is armed or disarmed, if power to said alarm is cut, AUX3 will immediately cause alarm O/P (123A) to drive said audible device to sound for a time determined by alarm timer (114).

7. Regardless of whether said alarm is armed or disarmed, while said toggle switch connected to ACC control (103) is off, if arm/disarm control (105) receives a continuous signal from said external arm/disarm device which lasts for a time determined by arm/disarm toggle (111), alarm O/P (123A) will drive said audible device to sound for said four sounding cycles.

Auxiliary alarm O/P (123B) drives an audible or visual device in response to said alarm's detecting of attempted break-in or vandalism. Auxiliary alarm O/P (123B) operates in the exact manner as alarm O/P (123A), except that there is a short delay of 1.0 seconds before said audible or visual device begins operating. Therefore, in those situations in which alarm O/P (123A) would drive its connected audible device for less than 1.0 seconds, auxiliary alarm O/P (123B) would not drive its connected audible or visual device.

Parking light O/P (124) drives the parking lights of said automobile in reaction to attempted break-ins and vandalisms detected by said alarm. Parking light O/P (124) drives said parking lights in one of six ways:

1. When said alarm is armed and arm/disarm control (105) receives a signal from said external arm/disarm device to disarm said alarm, parking light O/P (124) will drive said parking lights to flash twice, with on and off times being determined by parking timer (115). Note that in this case, the alarm acts as a car location device at night.

2. When said alarm is armed and arm/disarm control (105) receives a signal from said external arm/disarm device to disarm said alarm, if while said alarm was armed input M/D−, INO−, INO+, H/T−, C.S.+, INC−, or AUX1 was triggered, alarm memory (118) will cause parking light O/P (124) to drive said parking lights to flash a number of times, with on and off times being determined by parking timer (115). The number of times said parking lights flash is determined as follows: three times if M/D− was the first input triggered, four times if either INO− or INO+ were the first input triggered, five times if H/T− was the first input triggered, six times if C.S.+ was the first input triggered, seven times if INC− was the first input triggered, and nine times if AUX1 was the first input triggered. The only exception to the above number of flashes is if either INO− or INO+ were triggered after AUX1 was triggered, in which case said parking lights will flash only four times.

3. While said alarm is arming, if input INO−, INO+, H/T−, and/or INC− are triggered, parking light O/P (124) will drive said parking lights to flash once for a time period determined by parking timer (115) when the last of said inputs is reset, if said alarm is programmed to arm automatically as shown above. Parking light O/P (124) will also drive said parking lights to flash for said time period while said alarm is arming in response to receipt of a signal from said external arm/disarm device via arm/disarm control (105).

4. When said alarm is fully armed, if input M/D−, INO−, INO+, H/T−, C.S.+, or INC− is triggered, parking light O/P (124) will immediately start to drive said parking lights to flash continuously. The length of time of each flash of said parking lights and the length of time said parking lights rest between flashes is determined by parking timer (115). Parking light O/P (124) will drive said parking lights to flash for a length of time called the flash time which equal to said sounding time plus said rest time as determined by alarm timer (114). If within said sounding time said triggered input is reset, parking light O/P (124) will stop driving said parking lights at the expiration of said flash time. However, if within said sounding time said triggered input is not reset, parking light O/P will continue to drive said parking lights to flash for an additional time equal to three times said flash time, for a total of four flashing cycles.

5. Regardless of whether said alarm is armed or disarmed, if power to said alarm is cut, AUX3 will immediately cause parking light O/P (124) to drive said parking lights to flash for a time determined by parking timer (115).

6. Regardless of whether said alarm is armed or disarmed, while said toggle switch connected to ACC control (103) is off, if arm/disarm control (105) receives a continuous signal from said external arm/disarm device which lasts for a time determined by arm/disarm toggle (111), parking light O/P (124) will drive said parking lights to flash for said four flashing cycles.

Starter disable O/P (125), while said alarm is armed, drives a relay to disable the starting circuitry of said automobile in order to prevent theft of said automobile.

Status LED O/P (126) drives an LED or other light or sound source other than said audible device to indicate the status of said alarm. Said LED or other light or sound source will be in one of four modes:

1. Fast flash (for instance, 0.25 seconds on and 0.25 seconds off, with actual times determined by status LED driver [116]), indicating that said alarm is armed.

2. Off, indicating that said alarm is disarmed.

3. Slow flash (for instance, 0.5 seconds on and 1.5 seconds off, with actual times determined by status LED driver [116]), indicating that said alarm is in said valet mode.

4. Steady as long as said alarm is receiving a signal from said external arm/disarm device via arm/disarm control (105).

Door lock O/P (127) and door unlock O/P (128) drive said automobile's doors' power door lock system to lock or unlock said doors in the following manner. Note that the time it takes door lock O/P (127) and door unlock O/P (128) to lock and unlock said doors is programmable according to whether said power door lock system is of an electronic or vacuum type.

1. When said alarm arms, said doors will lock.
2. When said alarm disarms, said doors will unlock.
3. While said alarm is disarmed, if the last operation of said doors was to lock, said doors will unlock upon receiving a signal from said external arm/disarm device via arm/disarm control (105). If the last operation of said doors was to unlock, said doors will lock upon receiving a signal from said external arm/disarm device via arm/disarm control (105).

4. Lock operations always take priority over unlock operations. This means that, while said doors are unlocking, should door lock O/P (127) receive a signal from said external arm/disarm device via arm/disarm control (105), said doors will immediately lock. However, while said doors are locking, should door unlock O/P (128) receive a signal from said external arm/disarm device via arm/disarm control (105), said doors will not unlock.

Remote AUX2 O/P (129) drive the power windows of said automobile to automatically close when said alarm arms, and activates said power windows for a window closing time determined by window closing timer (121).

I claim:

1. A vehicle alarm control system built into a single integrated circuit including:

a number of inputs including M/D−, INO−, INO+, H/T−, C.S.+, and INC− which monitor a plurality of sensors strategically placed around an automobile and which, upon detection of attempted break-ins or vandalism to said automobile while said alarm is armed, immediately trigger audible and visible warning devices connected to a vehicle alarm;

an input AUX1 which monitors the handles of the doors of said automobile or other sensors and which, upon detection of attempts to open said doors or in some other way to break into or vandalize said automobile while said alarm is armed, triggers said audible and visible warning devices of said alarm;

an input AUX2 which, if the headlights of said automobile are turned on while the ignition switch of said automobile is turned off, triggers said audible warning device of said alarm;

an input AUX3 which, if the main power to the electrical circuits of said automobile is ever cut, triggers said audible warning device of said alarm;

a fan control to prevent M/D− and C.S.+ from triggering said audible or visible warning devices of said alarm if the electric cooling fan of said automobile is operating, if said automobile is so equipped;

a fail safe/override/memory circuit which prevents said alarm from arming if INO−, INO+, H/T−, or INC− is triggered while said alarm is disarmed;

a valet disarm entry override control which performs three functions: puts said alarm into and takes said alarm out of valet mode while said alarm is disarmed, said valet mode being a state in which said alarm will not arm; allows said alarm to be disarmed should the normal means of disarming said alarm be lost, stolen, or malfunctioning; and allows said alarm to override said fail safe/override/memory circuit should the user of said alarm require said alarm to arm even while INO−, INO+, H/T−, or INC− are triggered;

an ACC control connected to the electrical circuits of said automobile via a toggle switch which receives a +12 VDC signal from said circuits when said toggle switch is turned on;

an arm/disarm control connected to an external arm/disarm device;

an active/passive arm control which allows said alarm to be programmed to arm actively or passively, said active arming meaning that said alarm will arm only upon activation of said external arm/disarm device via said arm/disarm control, and said passive arming meaning that said alarm will arm automatically after said toggle switch connected to said ACC control is turned off and either INO−, INO+, H/T−, and/or C.S.+ is triggered and then reset;

a permanent disarm/auto rearm control connected to an on/off toggle switch which allows said alarm to be programmed to disarm permanently after the activation of said external arm/disarm device via said arm/disarm control and the triggering of either INO−, INO+, H/T−, or C.S.+, or to disarm permanently after the activation of said external arming device via said arm/disarm control and the turning on of said toggle switch connected to said ACC control;

a chirp enable/disable control connected to an on/off toggle switch which allows said alarm to be programmed to either indicate or not to indicate via an external audible device connected to said alarm when said external arm/disarm device is activated, or when either INO−, INO+, H/T−, or C.S.+ is reset to arm said alarm;

a passive/active door lock control connected to an on/off toggle switch which allows said alarm to be programmed to either lock the power door locks of said automobile automatically upon arming of said alarm or lock said power door locks only upon activation of said external arm/disarm device while said alarm is arming or while said alarm is armed;

an alarm output which drives an audible device connected to said alarm in response to said alarm's detection of attempted break-in or vandalism to said automobile for a length of time determined by an alarm timer, and which further drives said audible device for a shorter length of time also determined by said alarm timer upon arming or disarming of said alarm;

an auxiliary alarm output which drives an audible device connected to said alarm in response to said alarm's detection of attempted break-in or vandalism to said automobile for a length of time determined by said alarm timer;

an alarm memory which remembers which input of M/D−, INO−, INO+, H/T−, C.S.+, INC−, or AUX1 first triggered said alarm while said alarm was disarmed, unless INO− or INO+ triggered said alarm after AUX1 triggered said alarm, in which said alarm memory remembers INO− or INO+, with said alarm memory being reset upon the turning on of said toggle switch connected to said ACC control;

a parking light output which drives the parking lights of said automobile to flash in response to said alarm's detection of attempted break-in or vandalism to said automobile, the length of said flashing and the length of each individual flash determined by a parking timer, and which further drives said parking lights to flash once when said alarm is armed and twice when said alarm is disarmed;

a starter disable output to prevent the engine of said automobile from starting while said alarm is armed;

a status LED output to indicate via a connected LED when said alarm is armed, disarmed, or prevented from being disarmed by said valet disarm entry override control, or if said external arm/disarm device is activated;

a door lock output and a door unlock output which automatically lock the doors of said automobile when said alarm is armed, automatically unlock said doors when said alarm is disarmed, automatically lock said doors if the last operation was to unlock said doors and vice-versa in response to activation of said external arm/disarm device while said alarm is disarmed, and allow the locking of said doors to take priority over the unlocking of said doors, with the length of time of operation of the power door locks of said doors programmable according to whether said locks are activated electrically or by vacuum;

an auxiliary output to drive the power windows of said automobile to automatically close when said alarm arms, and which activates said power windows for a window closing time determined by window closing timer.

2. A vehicle alarm control system built into a single integrated circuit as claimed in claim 1 where said alarm memory is processed by means of a seven-segment synchronous decoding signal.

3. A vehicle alarm control system built into a single integrated circuit as claimed in claim 1 where said fail safe/override/memory circuit detects the failure of sensors connected to said M/D−, INO−, INO+, H/T−, C.S.+, or INC− and drives said alarm output and said parking light output to signal said failure.

4. A vehicle alarm control system built into a single integrated circuit as claimed in claim 1 where said memory circuit drives said parking light output to drive said parking lights to flash a number of times determined by said alarm memory to indicate which input of M/D−, INO−, INO+, H/T−, C.S.+, INC−, or AUX1 were first triggered if at all while said alarm was armed upon disarming of said alarm.

5. A vehicle alarm control system built into a single integrated circuit as claimed in claim 1 where the signal provided by said AUX1, upon an attempt by an intruder to enter said doors of said automobile by use of the handles of said doors, causes said alarm output and said parking light output to warn said intruder.

* * * * *